(12) United States Patent
Yanai

(10) Patent No.: US 10,928,568 B2
(45) Date of Patent: Feb. 23, 2021

(54) OPTICAL DEVICE AND DISPLAY DEVICE

(71) Applicant: FUJIFILM Corporation, Tokyo (JP)

(72) Inventor: Yujiro Yanai, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 197 days.

(21) Appl. No.: 16/164,231

(22) Filed: Oct. 18, 2018

(65) Prior Publication Data

US 2019/0049791 A1    Feb. 14, 2019

Related U.S. Application Data

(63) Continuation of application No. PCT/JP2017/014611, filed on Apr. 10, 2017.

(30) Foreign Application Priority Data

May 20, 2016 (JP) .................. 2016-101949

(51) Int. Cl.
*G02B 5/23* (2006.01)
*G02F 1/13* (2006.01)
(Continued)

(52) U.S. Cl.
CPC ............ *G02B 5/23* (2013.01); *G02F 1/1323* (2013.01); *G02F 1/13362* (2013.01); *G02F 1/13475* (2013.01); *G02F 1/133528* (2013.01); *G02F 1/133603* (2013.01); *G02F 1/133606* (2013.01); *G02B 5/3025* (2013.01);
(Continued)

(58) Field of Classification Search
None
See application file for complete search history.

(56) References Cited

U.S. PATENT DOCUMENTS 8,649,081 B1    2/2014  DeMeio et al.
2007/0146608 A1    6/2007  Jin et al.
(Continued)

FOREIGN PATENT DOCUMENTS

JP    2-504434 A    12/1990
JP    2004-279866 A    10/2004
(Continued)

OTHER PUBLICATIONS

International Preliminary Report on Patentability and Written Opinion of the International Searching Authority (Forms PCT/IB/326, PCT/IB/373 and PCT/ISA/237) for International Application No. PCT/JP2017/014611, dated Nov. 29, 2018, with English translation.
(Continued)

*Primary Examiner* — Britt D Hanley
(74) *Attorney, Agent, or Firm* — Birch, Stewart, Kolasch & Birch, LLP

(57) ABSTRACT

An optical device includes a polarizing plate; a composite film which contains a liquid crystal compound aligned in a thickness direction and a photochromic material and in which optical characteristics of the photochromic material are changed by emitting light and a light transmittance in the thickness direction becomes smaller than a light transmittance in a direction orthogonal to the thickness; and a light-emitting unit which emits light changing the optical characteristics of the photochromic material of the composite film.

12 Claims, 2 Drawing Sheets

(51) Int. Cl.
  *G02F 1/1347*   (2006.01)
  *G02F 1/1335*   (2006.01)
  *G02F 1/13357*   (2006.01)
  *G02B 5/30*   (2006.01)

(52) U.S. Cl.
  CPC .................. *G02F 1/133617* (2013.01); *G02F 2001/133614* (2013.01); *G02F 2202/14* (2013.01)

(56) References Cited

U.S. PATENT DOCUMENTS

| | | |
|---|---|---|
| 2008/0112049 A1 | 5/2008 | Umemoto et al. |
| 2010/0092784 A1 | 4/2010 | Kamada et al. |
| 2018/0259799 A1* | 9/2018 | Kroon ............... G02F 1/133512 |

FOREIGN PATENT DOCUMENTS

| | | |
|---|---|---|
| JP | 2007-178979 A | 7/2007 |
| JP | 2008-122485 A | 5/2008 |
| JP | 2008-165201 A | 7/2008 |
| JP | 2008-275976 A | 11/2008 |
| JP | 2008-281938 A | 11/2008 |
| JP | 2015-535946 A | 12/2015 |

OTHER PUBLICATIONS

International Search Report (Form PCT/ISA/210) for International Application No. PCT/JP2017/014611, dated Jun. 20, 2017, with English translation.
Japanese Office Action, dated Dec. 10, 2019, for Japanese Application No. 2018-518155 is provided, with an English translation.

* cited by examiner

OPTICAL DEVICE AND DISPLAY DEVICE

CROSS-REFERENCE TO RELATED APPLICATIONS

This application is a Continuation of PCT International Application No. PCT/JP2017/14611, filed on Apr. 10, 2017, which claims priority under 35 U.S.C. § 119(a) to Japanese Patent Application No. 2016-101949, filed on May 20, 2016. Each of the above application(s) is hereby expressly incorporated by reference, in its entirety, into the present application.

BACKGROUND OF THE INVENTION

1. Field of the Invention

The present invention relates to an optical device used for a display device such as a liquid crystal display device and a display device using this optical device.

2. Description of the Related Art

In personal electronic devices, for example, tablet personal computers (PCs), notebook PCs, and mobile phones such as smartphones, there is a demand that users do not want their screens to be peeped by the surrounding third parties. Therefore, in these electronic devices, it has been attempted to narrow the viewing angle of a screen such that the surrounding third parties cannot peep at the screen.

For example, JP2008-275976A describes a composite polarizing plate which is obtained by laminating a vertical polarizing film in which an absorption axis of a polarizer is aligned substantially perpendicular to the film surface and a horizontal polarizing film in which an absorption axis of a polarizer is aligned in a substantially horizontal direction with respect to the film surface.

This composite polarizing plate is capable of effectively reducing incidence rays from a vertically oblique direction. Therefore, a viewing angle of a screen can be narrowed using specific two oblique directions of a viewing angle as a light shielding area by only placing this composite polarizing plate on a screen of a plasma display or a liquid crystal display.

Meanwhile, in a case where this composite polarizing plate is placed on the screen, the composite polarizing plate is fixed thereto in a state in which the viewing angle from a specific direction is narrow. Accordingly, in a case where an image is displayed again at a typical wide viewing angle, the composite polarizing plate needs to be removed.

In other words, in a case of using this composite polarizing plate, it is necessary that the composite polarizing plate is detached from or attached onto the screen in order to switch between image display at a typical wide viewing angle and image display at a narrow viewing angle.

In addition, various display devices which are capable of switching between image display at a typical wide viewing angle and image display at a narrow viewing angle in order to ensure the security for preventing peeping from the side and to realize sufficient visibility from the side as necessary in electronic devices such as tablet PCs or notebook PCs have been suggested.

For example, JP2007-178979A discloses a liquid crystal display device including a first substrate which includes a gate wiring and a data wiring corresponding to red (R), green (G), blue (B), and white (W) subpixels; a thin film transistor which is disposed at the intersection of the gate wiring and the data wiring; a plate type first common electrode which is comprised in R, G, B, and W subpixels; a pixel electrode which is connected to the thin film transistor, is insulated from the first common electrode, and has a plurality of slits; a second substrate which is bonded to the first substrate in a state of facing the first substrate and comprises a liquid crystal layer in a space between the first substrate and the second substrate; and a plate type second common electrode which is formed on the second substrate so as to correspond to the W subpixel.

In a case of image display at a wide viewing angle in this liquid crystal display device, the W subpixel is driven in a fringe field switching (FFS) mode similar to the subpixels adjacent to R, G, and B subpixels so that the viewing angle is widened, and the W luminance is also compensated. In a case of image display at a narrow viewing angle, the W subpixel is driven in an electrically controlled birefringence (ECB) mode that enables formation of a vertical electric field, which is different from the subpixels adjacent to R, G, and B subpixels, and thus the viewing angle can be decreased.

Further, JP2004-279866A discloses a display device including a screen which has a viewing angle limited to one dimension direction; and image display switching means which switches between a personal view mode in which an erecting direction of an image to be displayed on this screen is substantially orthogonal to a limiting direction of the viewing angle and a multi view mode in which the erecting direction of the image coincides with the limiting direction of the viewing angle.

In other words, in this display device, it is possible to switch between image display at a wide viewing angle and image display at a narrow viewing angle depending on whether the top and the bottom of the image coincide with the limiting direction of the viewing angle or not by limiting the viewing angle of the screen to one dimension direction using a microprism sheet or the like and by rotating the image by 90°.

SUMMARY OF THE INVENTION

According to these display devices, it is possible to switch between image display at a typical wide viewing angle and image display at a narrow viewing angle using one display device without attaching or detaching any member.

However, in the liquid crystal display device of JP2007-178979A, the configuration of the display device becomes complicated because the liquid crystal display panel needs to have a special structure with W subpixels, a plurality of substrates, and a plurality of common electrodes and the liquid crystal display device needs to be driven in different modes.

Further, in the display device of JP2004-279866A, extra image processing becomes necessary since the image needs to rotate by 90° in order to switch between display at a wide viewing angle and display at a narrow viewing angle. Further, since the aspect ratio of a screen varies in a typical display device, the aspect ratios of an image vary between display at a wide viewing angle and display at a narrow viewing angle in this display device described in JP2004-279866A.

An object of the present invention is to solve the above-described problems of the related art and to provide an optical device which has a simple configuration and is capable of switching between image display at a typical wide viewing angle and image display at a narrow viewing angle obtained by limiting the viewing angle with a simple operation without performing detachment and attachment of a member nor performing image processing by being used in a tablet PC or a notebook PC; and a display device obtained by using this optical device.

According to the present invention, there is provided an optical device comprising: a polarizing plate; a composite film which contains a liquid crystal compound aligned in a thickness direction and a photochromic material and in which optical characteristics of the photochromic material are changed by irradiation with light and a light transmittance in the thickness direction becomes smaller than a light transmittance in a direction orthogonal to the thickness direction; and a light-emitting unit which emits light changing the optical characteristics of the photochromic material of the composite film to the composite film.

In the optical device, it is preferable that the light-emitting unit emits ultraviolet rays.

According to the present invention, there is provided a display device comprising: a display element; and the above-described optical device.

In the display device, it is preferable that the display element is a liquid crystal display element.

In the display device, it is preferable that the light-emitting unit of the optical device constitutes a backlight unit for allowing the liquid crystal display element to display an image.

In the display device, it is preferable that the polarizing plate of the optical device constitutes a polarizing plate on a side of the backlight unit for allowing the liquid crystal display element to display an image.

The optical device of the present invention has a simple configuration and is capable of switching between image display at a typical wide viewing angle and image display at a narrow viewing angle obtained by limiting the viewing angle, by being combined with a tablet PC or a notebook PC with a simple operation without performing detachment and attachment of a member. Further, the display device of the present invention is capable of switching between image display at a typical wide viewing angle and image display at a narrow viewing angle obtained by limiting the viewing angle, by utilizing the optical device of the present invention with a simple configuration and a simple operation without performing detachment and attachment of a member.

DESCRIPTION OF THE PREFERRED EMBODIMENTS

Hereinafter, an optical device and a display device according to the embodiment of the present invention will be described in detail based on preferred examples illustrated in the accompanying drawings.

Further, the numerical ranges shown using "to" in the present specification indicate ranges including the numerical values described before and after "to" as the lower limits and the upper limits.

In the present specification, the concept of "the same" includes a typically acceptable error range in the technical field. Further, in the present specification, the concept of "all", "any", or "the entire surface" includes a typically acceptable error range in the technical field, for example, a case of 99% or greater, 95% or greater, or 90% or greater in addition to a case of 100%.

Figure 1:
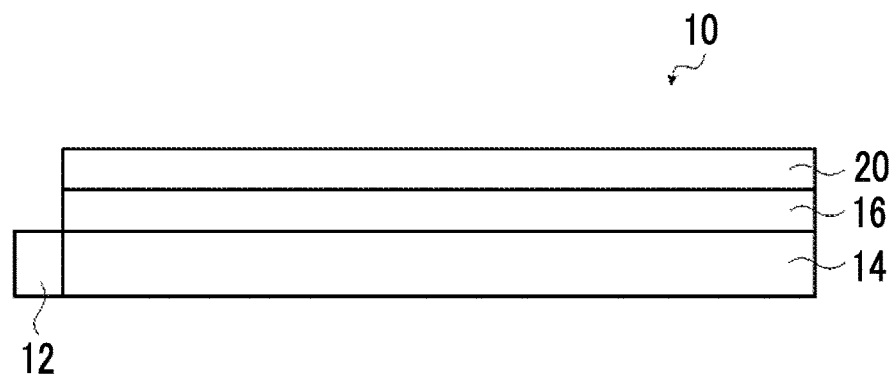
FIG. 1 is a view conceptually illustrating an example of an optical device of the present invention.
Figure 2:
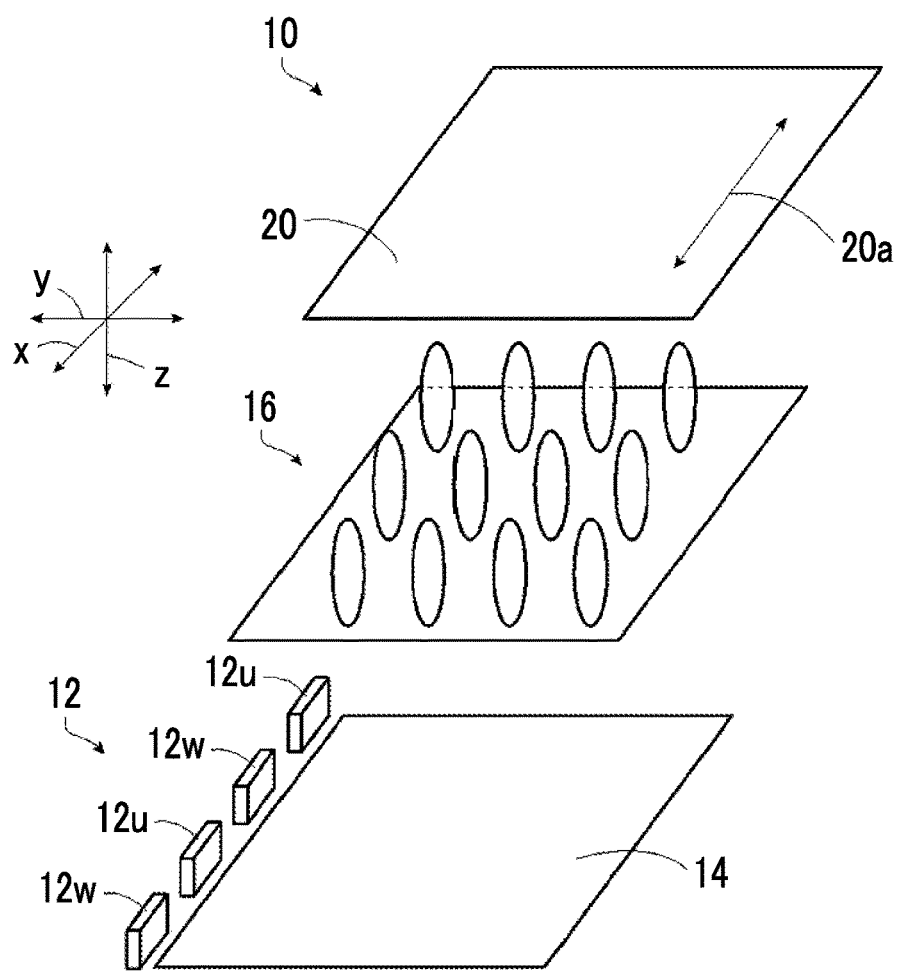
FIG. 2 is a conceptual view for describing a configuration of the optical device illustrated in FIG. 1.

FIGS. 1 and 2 conceptually illustrate an example of an optical device of the present invention.

As illustrated in FIGS. 1 and 2, an optical device 10 includes a light source unit 12, a light guide plate 14, a composite film 16, and a polarizing plate 20. In the example illustrated in the figures, the light source unit 12 and the light guide plate 14 constitute a light-emitting unit of the present invention which emits light that changes the optical characteristics of a photochromic material of the composite film 16 to the composite film 16.

Further, the light guide plate 14 and the composite film 16, and the composite film 16 and the polarizing plate 20 may be spaced from each other, laminated on each other, or bonded to each other using an optical clear adhesive (OCA), optical transparent double-sided tape, an optical transparent pressure sensitive sheet, and a pressure sensitive adhesive or an adhesive such as an ultraviolet curable resin, used for bonding a sheet-like optical device and an optical element.

FIGS. 1 and 2 also conceptually illustrate a portion of the display device according to the embodiment of the present invention which is formed by using the optical device 10. FIGS. 1 and 2 illustrate an example in which the optical device 10 is used as a liquid crystal display device. In the description below, the liquid crystal display device is also referred to as an LCD (liquid crystal display).

In other words, the light source unit 12 and the light guide plate 14 serve as a light-emitting unit in the optical device 10 and also serve as a backlight unit of the LCD. Further, the polarizing plate 20 is a polarizing plate in the optical device 10 and also is a polarizing plate on a backlight side (rear surface side) of the LCD. In addition, various known members, included in a typical LCD, such as a liquid crystal display element (liquid crystal display panel) having a thin film transistor, a liquid crystal cell, and the like; a polarizing plate on a front surface side; and light diffusion means such as a prism sheet are disposed on the upper side of the polarizing plate 20 in the figure.

In addition to the exemplified these members, the LCD may include various known members included in a known LCD.

The light source unit 12 may be formed by arranging a plurality of light sources in one direction.

As illustrated in FIG. 2, the light source unit 12 has a configuration in which white light sources 12$w$ and ultraviolet (UV) light sources 12$u$ are alternately arranged. The white light source 12$w$ is a light source emitting white light, which becomes a backlight for allowing an LCD to perform image display. The UV light source 12$u$ is a light source (light-emitting unit) emitting ultraviolet light (UV light), which changes the optical characteristics of the photochromic material of the composite film 16.

Further, FIG. 2 illustrates only four light sources, but the present invention is not limited thereto. In addition, the light source unit 12 is formed by alternately arranging the white light sources 12$w$ and the UV light sources 12$u$, but the present invention is not limited thereto.

In other words, the number of white light sources 12$w$ may be set to any number as long as the white light sources 12$w$ can emit a sufficient quantity of light for displaying an image using an LCD and the number of UV light sources 12$u$ may be set to any number as long as the UV light sources 12$u$ can emit a sufficient quantity of light for changing the optical characteristics of the photochromic material of the composite film 16 described below. Therefore, various configurations can be used as the arrangement of the white light sources 12*w* and the UV light sources 12*u*, for example, one UV light source 12*u* with respect to three white light sources 12*w* or one UV light source 12*u* with respect to six white light sources 12*w*.

In order to make the light quantity of the backlight uniform over the entire surface, it is preferable that the white light sources 12*w* are evenly arranged in the arrangement direction. Similarly, in order to properly change the optical characteristics of the photochromic material of the composite film 16 over the entire surface, it is preferable that the UV light sources 12*u* are evenly arranged in the arrangement direction.

As the white light source 12*w*, various light sources serving as a backlight of an LCD can be used. In addition, as the UV light source 12*u*, various known light sources capable of emitting light that changes the optical characteristics of the photochromic material of the composite film 16 can be used. The light that changes the optical characteristics of the photochromic material is not limited to ultraviolet light, and various light (light sources) that changes the optical characteristics of the photochromic material can be used according to the photochromic material to be used.

Accordingly, various known light sources can be used as the white light source 12*w* and the UV light source 12*u* as long as the light sources are capable of emitting light having a required wavelength (wavelength range), for example, a light emitting diode (LED), various lasers such as a semiconductor laser, and a fluorescent lamp.

As the white light source 12*w*, that is, the light source serving as a backlight of an LCD, a light source emitting light that does not have a wavelength (component) changing the optical characteristics of the photochromic material is preferable. Alternatively, even in a case where the white light source 12*w* emits light having a wavelength of changing the optical characteristics of the photochromic material, it is preferable that the light quantity is insufficient for changing the optical characteristics of the photochromic material.

In the present invention, the light source unit is not limited to the configuration in which a plurality of light sources are arranged in one direction as the example illustrated in the figure.

In other words, a linear light source such as a fluorescent lamp or a light source obtained by arranging a plurality of LEDs may be used as the light source. Alternatively, for example, the light source emitting light serving as a backlight is a linear light source, and the light source emitting light that changes the optical characteristics of the photochromic material may have a configuration in which a plurality of light sources are arranged in the longitudinal direction of the linear light sources for a backlight.

The light guide plate 14 is a typical light guide plate used as a backlight unit of an LCD.

Accordingly, various known light guide plates used as a backlight unit of an LCD are all available to be used as the light guide plate 14.

The composite film 16 contains a liquid crystal compound aligned in the thickness direction and a photochromic material. Further, it is preferable that the photochromic material is positioned (contained) between the liquid crystal compounds.

In a case where the UV light sources 12*u* are switched off, the composite film 16 is in a state of not functioning and does not act on light. In other words, in the case where the UV light sources 12*u* are switched off in the optical device 10 (LCD), the light applied from the light guide plate 14 is simply transmitted through the composite film 16.

On the contrary, in a case where the UV light sources 12*u* are switched on, the optical characteristics of the photochromic material of the composite film 16 is changed by ultraviolet light, and the light transmittance in the thickness direction of the composite film 16 becomes smaller than the light transmittance in a direction orthogonal to the thickness direction. In other words, in the case where the UV light sources 12*u* are switched on, the optical characteristics of the photochromic material of the composite film 16 is changed, and the composite film 16 enters the same state as the state of a polarizing plate having an absorption axis in the thickness direction, that is, a direction that coincides with the alignment direction of the liquid crystal compound.

The optical device 10 and a display device obtained by using the optical device 10 include such a composite film 16, the polarizing plate 20, the UV light sources 12*u* emitting ultraviolet light that changes the optical characteristics of the photochromic material, and the light guide plate 14 so that it becomes possible to switch image display at a typical wide viewing angle and image display at a narrow viewing angle in an LCD by switching off or switching on the UV light sources 12*u*.

This point will be described below.

In the present specification, the expression "the liquid crystal compound is aligned in the thickness direction" means that the liquid crystal compound is aligned at an angle of 80° to 90° with respect to the film surface (the main surface (maximum surface)) of the composite film 16. Further, the liquid crystal compound is aligned preferably at an angle of 85° to 90° and most preferably perpendicularly (90°) to the film surface of the composite film 16.

In the present specification, in a case where the liquid crystal compound is a rod-like liquid crystal compound, the expression "the liquid crystal compound is aligned in the thickness direction" means that the direction of a director of a rod-like liquid crystal compound is a direction perpendicular to the film surfaces of the composite film 16. Further, in a case where the liquid crystal compound is a discotic liquid crystal compound, the expression means that the direction of a normal line of a disc plane of a discotic liquid crystal compound is parallel to the film surfaces of the composite film 16.

The alignment of the liquid crystal compound in the thickness direction can be confirmed by observing the cross section of the composite film 16 using a transmission electron microscope (TEM).

In the present specification, the absorption axis of the composite film 16 in a state in which the UV light sources 12*u* are switched on means the thickness direction which is the same as the alignment direction of the liquid crystal compound, in other words, the absorption axis is at an angle of 80° to 90° with respect to the film surface of the composite film 16. Further, the absorption axis of the composite film 16 in a state in which the UV light sources 12*u* are switched on is preferably at an angle of 85° to 90° and most preferably perpendicularly (90°) to the film surface of the composite film 16.

As an example, such a composite film 16 can be prepared by coating a base material that has an alignment film on a surface thereof with a liquid crystal composition containing at least a liquid crystal compound and a photochromic material, vertically aligning the liquid crystal compound according to a guest-host method, and curing the liquid crystal compound to form a layer in which the molecules of the liquid crystal compound are fixed in a substantially vertically aligned state.

In other words, as an example, the composite film 16 is formed using a base material having an alignment film and a layer formed by curing a liquid crystal composition.

Specifically, the composite film 16 can be prepared in the same manner as a liquid crystal film formed by coating a base material having an alignment film on a surface thereof with a liquid crystal composition containing at least a liquid crystal compound, curing the composition, and fixing the molecules of the liquid crystal compound in a substantially vertically aligned state.

In the preparation of this liquid crystal film, a liquid crystal coated film is formed by coating a base material used for forming an alignment film with a liquid crystal composition containing at least a liquid crystal compound, a solvent, and an aligning agent or the like as necessary and drying the composition. Accordingly, the composite film 16 may be prepared using a liquid crystal composition obtained by further adding a photochromic material to the liquid crystal composition used for preparing the liquid crystal film.

—Base Material—

The shape, the structure, the size, or the like of the base material used for the composite film 16 is not particularly limited and can be appropriately selected according to the purpose thereof. Examples of the shape of the base material include a flat plate shape and a sheet shape. Further, examples of the base material thereof include a single layer structure and a laminated structure, and the structure thereof can be appropriately selected.

The material of the base material is not particularly limited, and any of an inorganic material or an organic material can be suitably used.

Examples of the inorganic material include glass, quartz, and silicon.

Examples of the organic material include an acetate-based resin such as triacetyl cellulose (TAC), a polyester-based resin, a polyether sulfone-based resin, a polysulfone-based resin, a polycarbonate-based resin, a polyamide-based resin, a polyimide-based resin, a polyolefin-based resin, an acrylic resin, a polynorbornene-based resin, a cellulose-based resin, a polyarylate-based resin, a polystyrene-based resin, a polyvinyl alcohol-based resin, a polyvinyl chloride-based resin, a polyvinylidene chloride-based resin, and a polyacrylic resin. These may be used alone or in combination of two or more kinds thereof.

The base material may be appropriately synthesized or a commercially available product may be used as the base material.

The thickness of the base material is not particularly limited and can be appropriately selected according to the purpose thereof. In addition, the thickness thereof is preferably in a range of 10 to 500 μm and more preferably in a range of 50 to 300 μm.

—Alignment Film—

As an example, the alignment film used for the composite film 16 is a film of a cured product, such as polyimide, polyamide imide, polyether imide, polyvinyl alcohol, or an acrylate monomer, which is laminated on the surface of the base material.

Further, the alignment film may be subjected to a photoalignment treatment. This photoalignment treatment is a treatment for generating anisotropy on a surface of a photoalignment film by irradiating photoactive molecules of an azobenzene-based polymer, polyvinyl cinnamate, or the like with linearly polarized light or obliquely unpolarized light having a wavelength that allows the photoactive molecules to cause a photochemical reaction. As the result, alignment of a molecular long axis of the outermost surface of the film is generated by incidence rays and the driving force that aligns liquid crystals in contact with the molecules of this outermost surface is formed.

Further, as the material of the photoalignment film, a material that generates anisotropy on the film surface using any reaction from among photoisomerization, photodimerization, photocyclization, photocrosslinking, photodecomposition, and photodecomposition-bonding, obtained by irradiating photoactive molecules with linearly polarized light having a wavelength that allows the photoactive molecules to cause a photochemical reaction, may be used, and examples thereof include various materials of photoalignment films which are described in "The Japanese Liquid Crystal Society, Masaki Hasegawa, Vol. 3, No. 1, p. 3 (1999)" and "The Japanese Liquid Crystal Society, Yasumasa Takeuchi, Vol. 3, No. 4, p. 262 (1999)".

In a case where such an alignment film is coated with a liquid crystal composition, liquid crystals are aligned using at least any of fine grooves on the surface of the alignment film or molecule alignment on the outermost surface as the driving force.

—Liquid Crystal Composition for Forming Composite Film 16—

<Liquid Crystal Compound>

The liquid crystal compound used for the liquid crystal composition for forming the composite film 16 is not particularly limited and can be appropriately selected according to the purpose as long as the compound contains a polymerizable group and is cured by irradiation with ultraviolet rays. Suitable examples of the liquid crystal compound include compounds represented by the following structural formula.

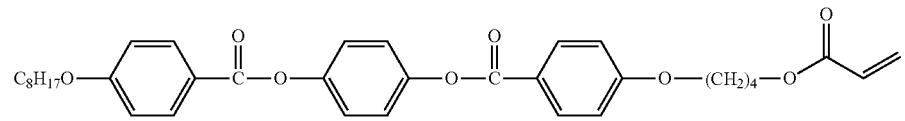

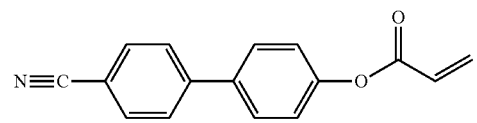

-continued
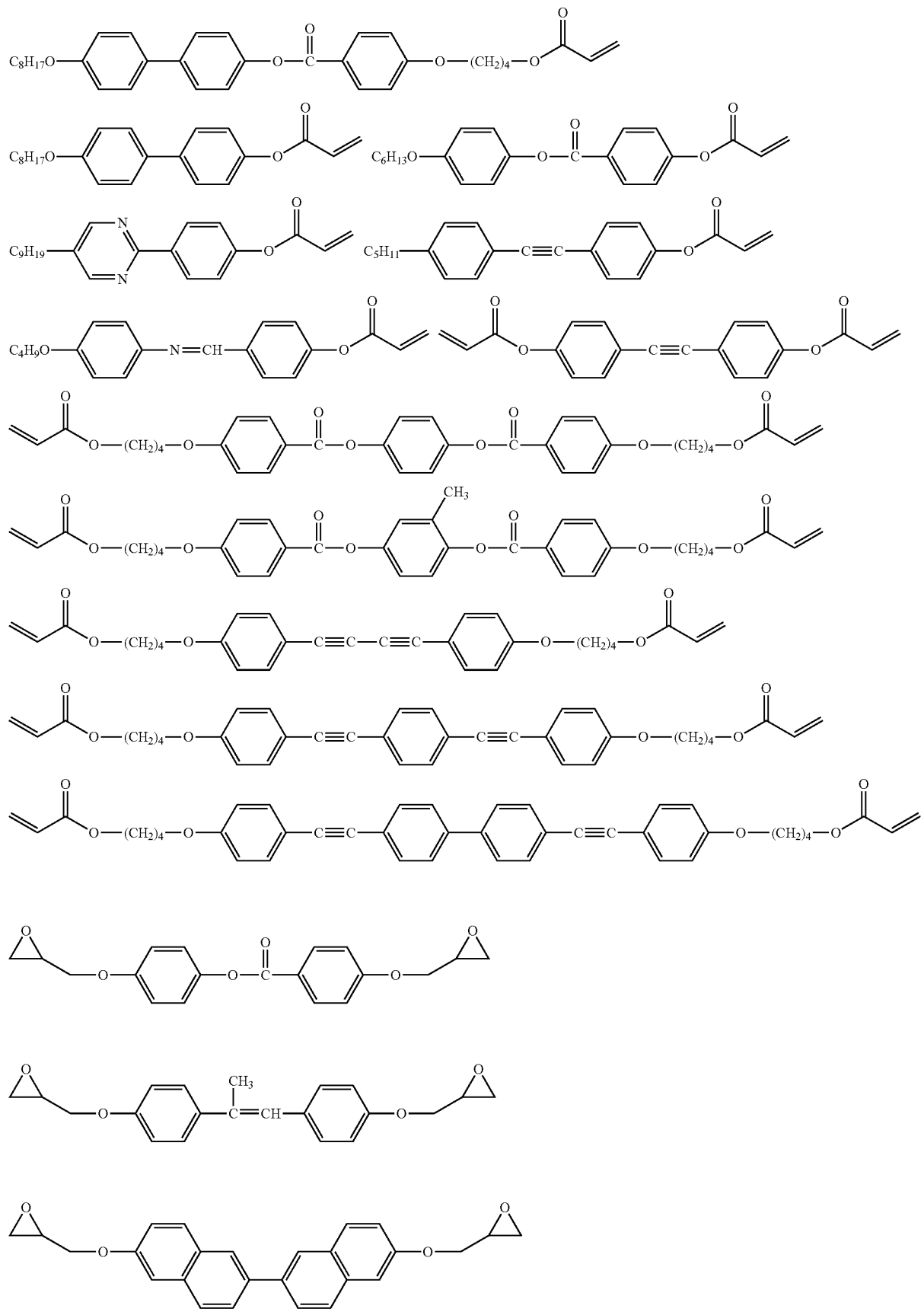

-continued

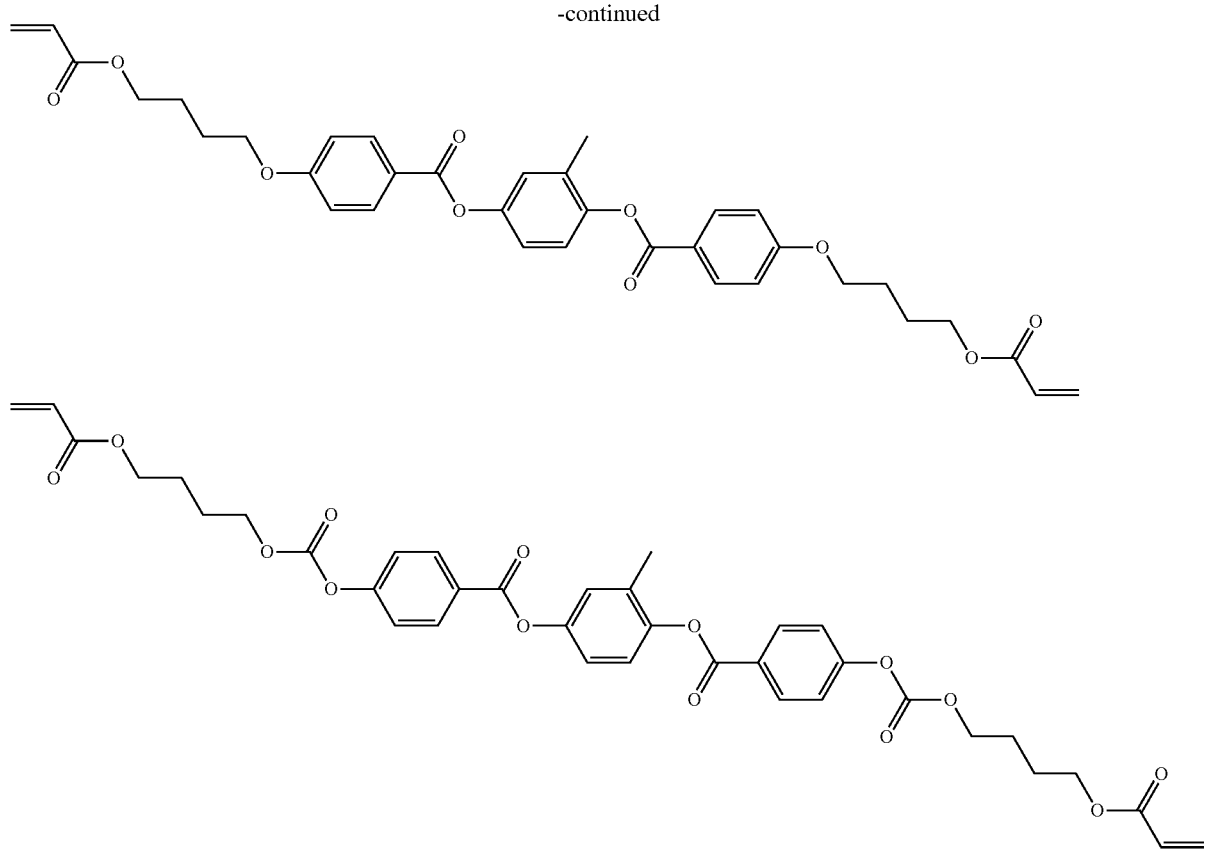

A commercially available product can be used as such a liquid crystal compound. Examples of the commercially available product include PALIOCOLOR LC242 (trade name, manufactured by BASF SE); E7 (trade name, manufactured by Merck KGaA); LC-silicon-CC3767 (trade name, manufactured by Wacker Chemie AG); L35, L42, L55, L59, L63, L79, and L83 (all trade names, manufactured by Takasago International Corporation).

The content of the liquid crystal compound is preferably in a range of 10% to 90% by mass and more preferably in a range of 20% to 80% by mass with respect to the total solid content of the liquid crystal composition.

<Air Interface Vertical Aligning Agent>

As described above, the composite film 16 contains a photochromic material and a liquid crystal compound aligning in the thickness direction, and in the case where the UV light sources 12u are switched on, the optical characteristics of the photochromic material are changed by ultraviolet light so that the composite film 16 enters the same state as the state of a polarizing plate having an absorption axis in the thickness direction, that is, a direction that coincides with the alignment direction of the liquid crystal compound.

For this, a liquid crystal layer (liquid crystal compound) which is a medium is aligned in the thickness direction. The liquid crystal layer formed on the alignment film provided on one surface of the base material is substantially vertically aligned in some cases from the alignment film side to the air interface side by adjusting the terminal thereof to be hydrophobic. However, in this state, the liquid crystal layer is obliquely distorted in the air interface. Therefore, the liquid crystal layer is more stably aligned in the thickness direction by adding the air interface vertical aligning agent to the liquid crystal composition for forming the composite film 16.

The air interface vertical aligning agent is not particularly limited and can be appropriately selected according to the purpose thereof. In addition, the air interface vertical aligning agent can be used by being appropriately selected from the compounds described in paragraphs <0110> to <0194> of JP2006-301605A.

Further, the air interface vertical aligning agent can be used by being selected from polymeric surfactants having a strong interaction with the liquid crystal layer to be used, and suitable examples thereof include MEGAFACE F780F (manufactured by DIC Corporation).

The content of the air interface vertical aligning agent is preferably in a range of 0.01% to 5.0% by mass and more preferably in a range of 0.05% to 3.0% by mass with respect to the total solid content of the liquid crystal composition.

<Photopolymerization Initiator>

It is preferable that the liquid crystal composition for forming the composite film 16 contains a photopolymerization initiator. The photopolymerization initiator is not particularly limited and can be appropriately selected from known initiators according to the purpose thereof. Examples thereof include p-methoxyphenyl-2,4-bis(trichloromethyl)-s-triazine, 2-(p-butoxystyryl)-5-trichloromethyl 1,3,4-oxadiazole, 9-phenylacridine, 9,10-dimethylbenzphenazine, benzophenone/Michler's ketone, hexaarylbiimidazole/mercaptobenzimidazole, benzyl dimethyl ketal, and thioxanthone/amine. These may be used alone or in combination of two or more kinds thereof.

As these photopolymerization initiators, commercially available products can be used. Examples of the commercially available products include IRGACURE 907, IRGACURE 369, IRGACURE 784, IRGACURE 814, and LUCIRIN TPO (all trade names, manufactured by BASF SE).

The amount of the photopolymerization initiator to be added is preferably in a range of 0.1% to 20% by mass and more preferably in a range of 0.5% to 5% by mass with respect to the mass of the total solid content in the liquid crystal composition.

<Solvent>

The solvent used in the liquid crystal composition for forming the composite film 16 is not particularly limited and can be appropriately selected according to the purpose thereof. Examples of the solvent include halogenated hydrocarbons such as chloroform, dichloromethane, carbon tetrachloride, dichloroethane, tetrachloroethane, methylene chloride, trichloroethylene, tetrachloroethylene, chlorobenzene, and orthodichlorobenzene; phenols such as phenol, p-chlorophenol, o-chlorophenol, m-cresol, o-cresol, and p-cresol; aromatic hydrocarbons such as benzene, toluene, xylene, methoxybenzene, and 1,2-dimethoxybenzene; a ketone-based solvent such as acetone, methyl ethyl ketone (MEK), methyl isobutyl ketone, cyclohexanone, cyclopentanone, 2-pyrrolidone, or N-methyl-2-pyrrolidone; an ester-based solvent such as ethyl acetate or butyl acetate; an alcohol-based solvent such as t-butyl alcohol, glycerin, ethylene glycol, triethylene glycol, ethylene glycol monomethyl ether, diethylene glycol dimethyl ether, propylene glycol, dipropylene glycol, or 2-methyl-2,4-pentadiol; an amide-based solvent such as dimethylformamide or dimethylacetamide; a nitrile-based solvent such as acetonitrile or butyronitrile; an ether-based solvent such as diethyl ether, dibutyl ether, tetrahydrofuran, or dioxane; and carbon disulfide, ethyl cellosolve, and butyl cellosolve. These may be used alone or in combination of two or more kinds thereof.

<Photochromic Material>

The photochromic material used in the liquid crystal composition for forming the composite film 16 is not particularly limited, and various known photochromic materials can be used.

Examples of the photochromic material include those described in paragraphs <0089> to <0339> of US2005/0012998A1, but the present invention is not limited thereto.

The content of the photochromic material is preferably in a range of 3% to 30% by mass, more preferably in a range of 5% to 20% by mass, and still more preferably in a range of 8% to 15% by mass with respect to the total solid content in the liquid crystal composition.

The base material (alignment film) can be coated with the liquid crystal composition for forming the composite film 16 according to a known coating method. Examples of the coating method include a spin coating method, a cast method, a roll coating method, a flow coating method, a printing method, a dip coating method, a casting film forming method, a bar coating method, and a gravure printing method.

As the method of curing the liquid crystal composition for forming the composite film 16, heat curing or light curing may be employed, but light curing is particularly preferable.

The composite film 16 is not limited to the configuration having a base material, and various configurations can be employed. For example, a configuration obtained by using the light guide plate 14 as a surface on which the composite film 16 is formed, forming an alignment film on a surface of the light guide plate 14, coating the surface with the liquid crystal composition for forming the composite film 16, and curing the composition may be used.

The polarizing plate 20 is a typical polarizing plate which is a linear polarizing plate having a transmission axis in one direction and is used in an LCD or the like.

Accordingly, various typical linear polarizing plates, for example, reflection type polarizing plates such as an absorption type polarizing plate that contains an iodine compound or a wire grid can be used as the polarizing plate 20.

Hereinafter, the details of the optical device 10 and the LCD (display device) will be described by explaining the action of the optical device 10 with reference to the conceptual view of FIG. 3 in addition to FIGS. 1 and 2.

In the description below, for convenience, the vertical direction in the display of the display device, that is, the top and bottom direction of the display is set as an x direction, the horizontal direction orthogonal to the x direction is set as a y direction, and the thickness direction of the composite film 16 orthogonal to the x direction and y direction is set as a z direction.

Figure 3:
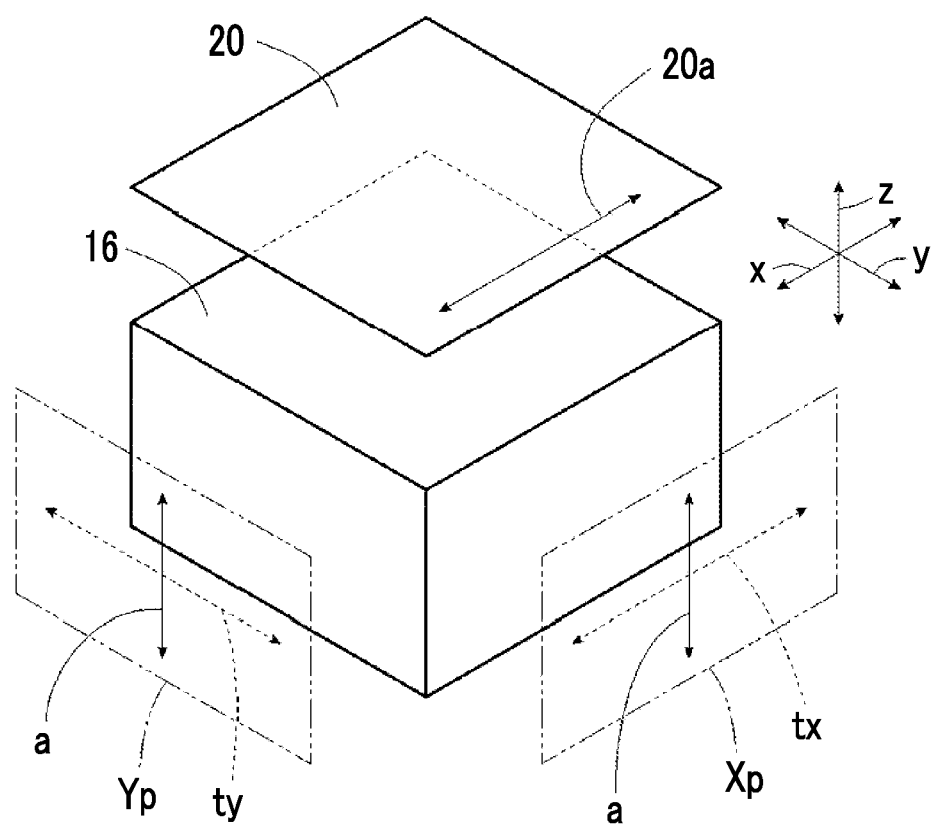
FIG. 3 is a conceptual view for describing an action of the optical device illustrated in FIG. 1.

In FIGS. 2 and 3, the arrow in the polarizing plate 20 indicates the absorption axis 20a. In the example illustrated in the figures, the absorption axis 20a of the polarizing plate 20 coincides with the x axis direction, that is, the vertical direction of the display.

In the LCD obtained by using the optical device 10, only the white light sources 12w are switched on without switching on the UV light sources 12u of the light source unit 12 in a case where image display is performed at a typical wide viewing angle.

As described above, in the optical device 10, the composite film 16 is in a state of not functioning in a case where the UV light sources 12u are switched off.

Therefore, white light emitted from the white light sources 12w, propagated by the light guide plate 14, and emitted from the main surface of the light guide plate 14 is transmitted through the composite film 16, becomes linearly polarized light in the x direction by the polarizing plate 20, is incident on the liquid crystal display element thereon, and is provided for image display.

Accordingly, in this state, image display at a typical wide viewing angle is performed in the LCD. Further, since the composite film 16 is in a state of not functioning in a case where the UV light sources 12u are switched off, the light transmittance is maintained to be high even in a case where the optical device includes the composite film 16.

Meanwhile, in a case where the UV light sources 12u are switched on, white light emitted from the white light sources 12w and ultraviolet light emitted from the UV light sources 12u are incident on the composite film 16.

As described above, in a case where the ultraviolet light is incident on the composite film 16, the optical characteristics of the photochromic material of the composite film 16 are changed. Due to the change in optical characteristics of this photochromic material, the light transmittance of the composite film 16 in the thickness direction (z direction) becomes smaller than the light transmittance in a direction orthogonal to the thickness direction.

In other words, in the case where the UV light sources 12u are switched on, the optical characteristics of the photochromic material are changed due to the incidence of ultraviolet light on the composite film 16 so that the composite film 16 enters the same state as the state in which an absorption axis is generated in the thickness direction (the alignment direction of the liquid crystal compound), that is, the z direction. Further, the generation of the absorption axis results in a state in which a transmission axis is generated in a direction orthogonal to the absorption axis.

Accordingly, in the case where the UV light sources 12u are switched on, the composite film 16 enters a state as in a polarizing plate whose absorption axis is allowed to coincide with the thickness direction.

Specifically, as conceptually illustrated in FIG. 3, in the case where the UV light sources 12u are switched on, the composite film 16 enters a state as in a polarizing plate Yp (two-dot chain line) which has an absorption axis a (an arrow indicated by the solid line) in the z direction, has a transmission axis ty (an arrow indicated by the broken line) in the y direction, and is in parallel with the z direction and the y direction, in a case where the display image is observed from a direction at an elevation angle of 45° in the x direction.

Further, similarly in the case where the UV light sources 12u are switched on, the composite film 16 enters a state as in a polarizing plate Xp (two-dot chain lines) which has an absorption axis a (the arrow indicated by the solid line) in the z direction, has a transmission axis tx in the x direction, and is in parallel with the z direction and the x direction, in a case where the display image is observed from a direction at an elevation angle of 45° in the y direction.

The absorption axis a generated in the composite film 16 in the state in which the UV light sources 12u are switched on is in the z direction, that is, the thickness direction. Therefore, in a case where the LCD is observed from the direction (z direction) orthogonal to the front surface, that is, the image display surface, the absorption axis a is almost in a state of not existing, in other words, the composite film 16 does not act as a polarizing plate.

Therefore, the image displayed by the LCD can be usually observed from the front surface.

In a case where the LCD is observed from the x direction, the composite film 16 is in the same state as in the polarizing plate Yp which is parallel to the z direction and the y direction. Further, since the absorption axis a is in the z direction (thickness direction), in the case where the observation direction is the x direction, the action of the composite film 16 as the polarizing plate Yp is increased as the value of the elevation angle is decreased.

Therefore, in the case where the observation direction is the x direction and the value of the elevation angle is decreased, the light to be transmitted through the composite film 16 becomes linearly polarized light in the y direction due to the transmission axis ty of the polarizing plate Yp in the y direction.

Here, the absorption axis 20a of the polarizing plate 20 to be disposed on the composite film 16 is in the x direction, that is, the transmission axis is in the y direction. Accordingly, even in a case where the image is observed from the direction at an elevation angle of 45° in the x direction, the linearly polarized light in the y direction which has been transmitted through the composite film 16 is transmitted through the polarizing plate 20, incident on the liquid crystal display element, and provided for image display.

Consequently, in the state in which the UV light sources 12u are switched on, the image can be usually observed from the x direction. In other words, the viewing angle in the x direction is not narrowed even in a case where the UV light sources 12u are switched on.

In a case where the LCD is observed from the y direction, the composite film 16 is in the same state as in the polarizing plate Xp which is parallel to the z direction and the x direction. Similar to the polarizing plate Yp, in the case where the observation direction is the y direction, the action of the composite film 16 as the polarizing plate Xp is increased as the value of the elevation angle is decreased.

Therefore, in the case where the observation direction is an elevation angle of 45° in the y direction, the light to be transmitted through the composite film 16 becomes linearly polarized light in the x direction due to the transmission axis tx of the polarizing plate Xp in the x direction.

Here, the absorption axis 20a of the polarizing plate 20 to be disposed on the composite film 16 is in the x direction. Accordingly, in a case where the image is observed at an elevation angle of 45° in the y direction, the light turned into the linearly polarized light in the x direction which has been transmitted through the composite film 16 is absorbed by the absorption axis 20a of the polarizing plate 20, and thus is not provided for image display.

Consequently, in the state in which the UV light sources 12u are switched on, image observation at an optional elevation angle in the y direction is more difficult than observation at an optional elevation angle in the x direction. In other words, image display at a narrow viewing angle can be performed by switching on the UV light sources 12u so that the viewing angle in the y direction is narrowed.

In this example, the light transmittance in the thickness direction in a case where the image is observed from the y direction becomes smaller than the light transmittance in a direction orthogonal to the thickness direction.

This can be expressed as a difference in light transmittance between the elevation angle of 0° and the elevation angle of 45° in the y direction of the optical device 10.

A light transmittance ratio (Y0/Y45) can be calculated by measuring the luminance Y0 at an elevation angle of 0° (front surface direction) and the luminance Y45 at an angle of 45° in white display using a measuring device "EZ-Contrast XL88" (manufactured by ELDIM).

The value of (Y0/Y45) is preferably 10 or greater, more preferably 100 or greater, and still more preferably 1000 or greater.

A difference in light transmittance is obtained by emitting polarized light from a light source and measuring the transmittance of light to be transmitted through the composite film.

Further, the optical characteristics of the photochromic material of the composite film 16 are returned to the original state by switching off the UV light sources 12u, and the composite film 16 is in a state of not functioning before the UV light sources 12 are switched on. Therefore, image display at a typical wide viewing angle is performed.

Moreover, at the time of switching off the UV light sources 12u, the time for returning the optical characteristics of the photochromic material to the original state may be shortened by heating the composite film 16 and/or irradiating the composite film 16 with light having a wavelength different from the wavelength of the ultraviolet light.

As described above, according to the optical device 10 and the LCD obtained by using this optical device 10, it is possible to switch between image display at a typical wide viewing angle and image display at a narrow viewing angle obtained by narrowing the viewing angle in one direction with a simple operation of switching on and off the UV light sources 12u.

Further, the configuration of the LCD is a simple configuration formed by adding only the UV light sources 12u and the composite film 16.

In the example described above, the viewing angle in the y direction in the figures is narrowed, but the viewing angle in a desired direction can be narrowed by selecting the direction of the absorption axis 20a of the polarizing plate 20.

For example, in a case where the viewing angle in the x direction is expected to be narrowed by switching on the UV light sources 12u, the absorption axis 20a of the polarizing plate 20 may be set in the y direction.

In other words, the viewing angle in the desired direction can be narrowed by allowing the absorption axis 20a to coincide with a direction orthogonal to the direction in which the viewing angle is expected to be narrowed and disposing the polarizing plate 20.

The example illustrated in the figures is an example in which the optical characteristics of the photochromic material are changed by irradiation with ultraviolet light and the composite film 16 functions as a polarizing plate having an absorption axis and a transmission axis, but the present invention is not limited thereto.

In other words, the present invention may employ the configuration in which the composite film is in a state of not functioning in a case where the optical characteristics of the photochromic material are changed by irradiation with ultraviolet rays, and the irradiation of ultraviolet rays is stopped and the optical characteristics of the photochromic material are returned to the original state, and the composite film functions as a polarizing plate having an absorption axis and a transmission axis in this state.

In the example illustrated in the figures, the backlight unit of the LCD is of an edge light type using the light guide plate 14, but the present invention is not limited thereto. In other words, a so-called direct type backlight unit that emits light from a light source to a liquid crystal display panel using a reflector or the like without using a light guide plate can also be used. At this time, for example, a light source emitting ultraviolet light or the like for changing the optical characteristics of the photochromic material may be disposed in the reflector of the direct type backlight unit together with the light source emitting light serving as a backlight.

Further, in the example illustrated in the figures, the light source unit 12 and the light guide plate 14 also have a backlight unit in the LCD and a light-emitting unit which emits light that changes the optical characteristics of the photochromic material in the optical device 10 to the composite film 16, but the present invention is not limited thereto.

In other words, the backlight unit for display an image in the LCD and the light-emitting unit of the optical device which emits light for changing the optical characteristics of the photochromic material to the composite film may be separately provided. As an example, a configuration in which a direct type is employed as the backlight unit in the LCD, an edge light type is employed as the light-emitting unit that emits light for changing the optical characteristics of the photochromic material, and the light guide plate constituting the light-emitting unit of the optical device is disposed on the light emitting surface of the direct type backlight unit is exemplified.

Further, the example illustrated in FIGS. 1 and 2 is an example in which the optical device 10 is incorporated in the liquid crystal display device, but the optical device according to the embodiment of the present invention is not limited thereto.

In other words, the optical device according to the embodiment of the present invention may be a single optical device which includes a polarizing plate, a composite film, and a light-emitting unit emitting light that changes the optical characteristics of the photochromic material of the composite film to the composite film and is provided separately from the display device.

In a case where a single optical device constitutes one device, the light-emitting unit may be of an edge light type or direct type. In a case where an edge light type is employed as the light-emitting unit at this time, a typical light guide plate used for a backlight unit of an LCD can be used as the light guide plate.

As a single optical device separately provided from the display device, an optical device including a light-emitting unit which includes a light guide plate and a light source unit having a light source emitting ultraviolet light to the light guide plate; a composite film; and a polarizing plate is exemplified. In other words, this optical device has the same configuration as in FIG. 1 except that the light source unit 12 does not include the white light sources 12w.

By placing this optical device on a display surface (observation surface) of a display device such as an LCD, an organic electroluminescence display device, or a plasma display device and performing the above-described action of switching on and off the light sources of the light source unit, it is possible to switch between image display at a typical wide viewing angle in a state in which the light sources of the light source unit are switched off and image display at a narrow viewing angle in a state in which the light sources of the light source unit are switched on.

Hereinbefore, the optical device and the display device according to the embodiment of the present invention have been described in detail, but the present invention is not limited to the examples described above and various improvements or modifications can be made within the range not departing from the scope of the present invention.

EXAMPLES

The features of the present invention will be described in detail with reference to the following examples. The materials, the reagents, the used amounts, the amounts of substances, the ratios, the treatment contents, and the treatment procedures described in the following examples can be appropriately changed within the range not departing from the gist of the present invention. Therefore, the range of the present invention should not be limitatively interpreted by the following specific examples.

Example

<Preparation of Film 01>

The following materials were put into a mixing tank and stirred while being heated so that each component was dissolved, thereby preparing a cellulose acetate solution (dope) with the following composition.

<<Composition>>

Cellulose acetate (acetyl substitution degree of 2.86) . . . 100 parts by mass

Triphenyl phosphate . . . 8 parts by mass

Biphenyl diphenyl phosphate . . . 4 parts by mass

Methylene chloride . . . 369 parts by mass

Methanol . . . 80 parts by mass

1-Butanol . . . 4 parts by mass

The prepared dope was heated to 30° C. and allowed to pass through a casting geeser so that the dope was cast on a glass plate. The surface temperature of the glass was set to −5° C., and the space temperature of the entire casting portion was set to 15° C.

After the casting, the dope was allowed to stand for 1 minute, dried at 45° C. for 1 minute, and peeled off from the glass. Next, the resultant was dried at 110° C. for 5 minutes and further dried at 140° C. for 10 minutes, thereby obtaining a protective film having a thickness of 80 μm. This protective film was set as a film 01. This film 01 is used as the base material of the composite film 16.

<Formation of Acrylic Layer>

The following materials and solvent were put into a mixing tank, stirred, and filtered using a polypropylene filter having a pore diameter of 0.4 μm, thereby preparing a composition for forming an acrylic layer.

<<Composition for Forming Acrylic Layer>>

Compound A . . . 70 parts by mass

Compound B . . . 30 parts by mass

Isopropyl alcohol . . . 425 parts by mass

Methyl acetate . . . 142 parts by mass

Compound A: KAYARAD PET 30 (manufactured by Nippon Kayaku Co., Ltd., a mixture of a compound with the following structure, the mass average molecular weight is 298, and the number of functional groups in one molecule is 3.4 (average).)

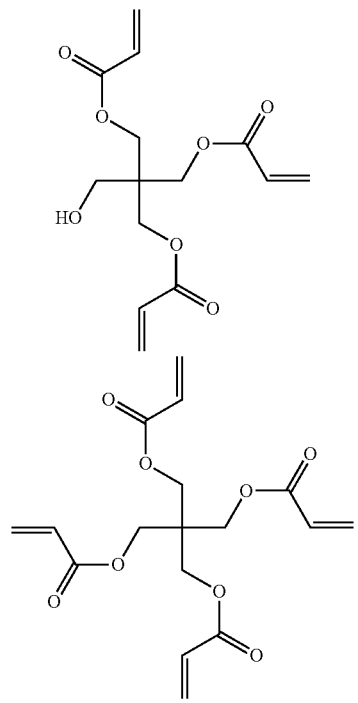

Compound B: BLEMMER GLM (manufactured by NOF CORPORATION, a compound with the following structure)

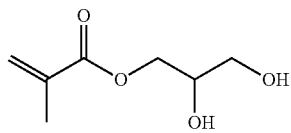

4% by mass of a photopolymerization initiator (IRGACURE 127, manufactured by BASF SE) was added to this composition for forming an acrylic layer with respect to the solid content in the composition for forming an acrylic layer.

Next, the film 01 was coated with the composition for forming an acrylic layer obtained by adding a photopolymerization initiator, using a gravure coater. The composition was dried at 100° C. and irradiated with ultraviolet rays having an illuminance of 400 mW/cm$^2$ and an irradiation dose of 150 mJ/cm$^2$ using an air-cooled metal halide lamp (manufactured by EYE GRAPHICS CO., LTD.) having an intensity of 160 W/cm while nitrogen purging such that the oxygen concentration was set to 1.0% by volume or less so that the coating layer was cured, thereby forming an acrylic layer on the film 01. The thickness of the acrylic layer was 0.3 μm. This acrylic layer is formed into an alignment film in the composite film 16.

<Preparation of Composite Film 16>

A liquid crystal composition for forming the composite film 16 containing a photochromic material and a liquid crystal compound with the following composition was prepared.

<<Liquid Crystal Composition for Forming Composite Film 16>>

Total amount of B01 and B02 . . . 100 parts by mass

S1 . . . 1 part by mass

S2 . . . 0.5 parts by mass

S3 . . . 0.8 parts by mass

Photochromic material mixture shown below . . . 3 parts by mass

Photopolymerization initiator (IRGACURE 907, manufactured by BASF SE) . . . 3 parts by mass Sensitizer (KAYACURE DETX, manufactured by Nippon Kayaku Co., Ltd.) . . . 1 part by mass Methyl ethyl ketone (MEK) . . . 195 parts by mass Cyclohexanone (anone) . . . 22 parts by mass In this liquid crystal composition, B01 and B02 are respectively a liquid crystal compound, and S1, S2, and S3 are respectively the above-described air interface vertical aligning agent.

B01: a compound with the following structure
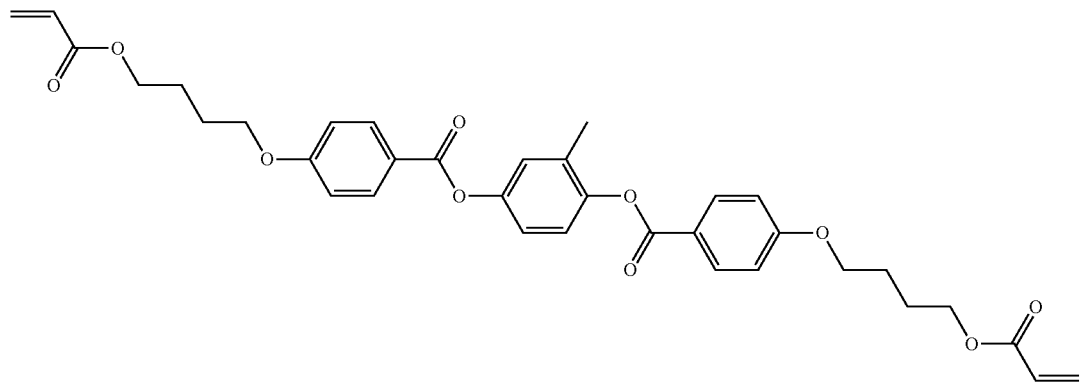 [SMILES: C=CC(=O)OCCCCOc1ccc(C(=O)Oc2ccc(OC(=O)c3ccc(OCCCCOC(=O)C=C)cc3)c(C)c2)cc1]
B02: a compound with the following structure
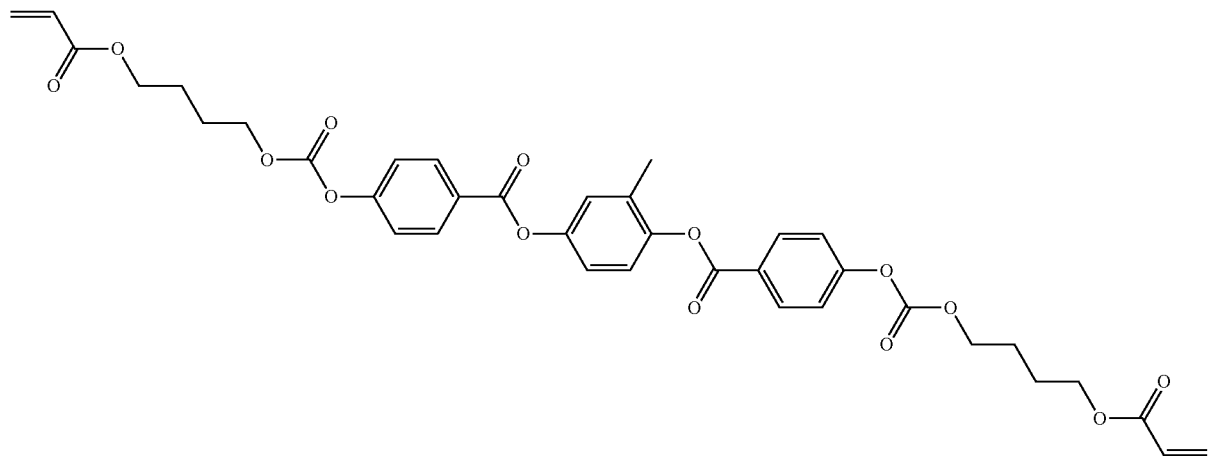 [SMILES: C=CC(=O)OCCCCOC(=O)Oc1ccc(C(=O)Oc2ccc(OC(=O)c3ccc(OC(=O)OCCCCOC(=O)C=C)cc3)c(C)c2)cc1]
S1: a compound with the following structure
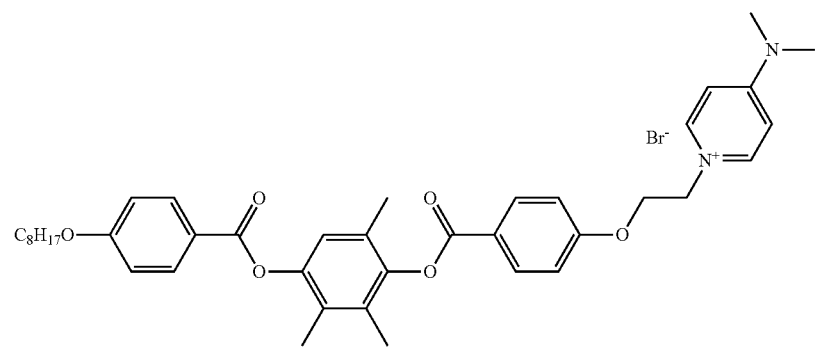

S2: a compound with the following structure

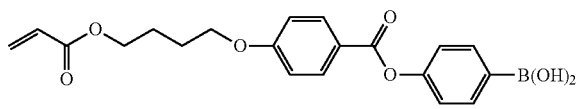 [SMILES: C=CC(=O)OCCCCOc1ccc(C(=O)Oc2ccc(B(O)O)cc2)cc1]

S3: a compound with the following structure

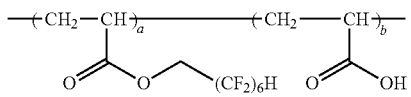

In the formulae shown above, a:b is 90:10 (mass ratio).
Mixture of photochromic materials: a mixture listed in the following table.

TABLE 1

| Mixture of photochromic materials | |
|---|---|
| Photochromic material | Content in mixture (% by mass) |
| Photochromic A | 50 |
| Photochromic B | 30 |
| Photochromic C | 20 |

In the table shown above, the photochromic A indicates an indenonaphthopyran reported to generate a blue activation color.

The photochromic B indicates an indenonaphthopyran reported to generate a greenish activation color.

The photochromic C indicates an indenonaphthopyran reported to generate a reddish brown activation color.

The acrylic layer of the film 01 used to form an acrylic layer was coated with the prepared liquid crystal composition for forming the composite film 16 using a bar coater such that the coating amount thereof was set to 4 ml/m$^2$.

The composition was heated at a maturing temperature of 100° C. for 120 seconds and irradiated with ultraviolet rays with an illuminance of 600 mW/cm$^2$ for 4 seconds using an ultraviolet irradiation device (ultraviolet lamp: output of 160 W/cm, light emitting length of 1.6 m) while the temperature was maintained at 100° C., and the crosslinking reaction was promoted. Thereafter, the resultant was naturally cooled to room temperature, thereby obtaining a composite film 16.

The prepared composite film 16 was adhered to an acrylic plate (thickness of 2 mm) using a pressure sensitive adhesive (SK DYNE, manufactured by Soken Chemical & Engineering Co., Ltd.).

At this time, the acrylic plate was brought into contact with the surface which had been coated with the liquid crystal composition.

Next, the iPad (registered trademark, manufactured by APPLE Inc.) was disassembled, the acrylic plate adhered to the composite film 16 was disposed between the liquid crystal panel and the backlight, and ten pieces of UVLED (NSPU510US, manufactured by NICHIA CORPORATION) were equally arranged in a state of facing one end surface of the acrylic plate.

First, in a case where an image displayed on the iPad was observed in a state in which UVLED was not switched on, the image was able to be observed properly in a case of being obliquely observed from any directions similar to a typical iPad.

Next, in a case where the screen of the iPad was obliquely observed from a direction (the y direction of FIG. 2) orthogonal to the absorption axis of the polarizing plate on the rear surface side of the iPad in a state in which UVLED was switched on and the screen was irradiated with ultraviolet light, the image displayed on the iPad was not possible to see.

In a case where the image displayed on the iPad was observed after five minutes from when UVLED was switched off, the image was able to be observed properly in a case of being obliquely observed from any directions similar to a typical iPad and to the observation performed before UVLED was switched on.

Here, Y0/Y45 in the direction (the y direction of FIG. 2) orthogonal to the absorption axis of the polarizing plate on the rear surface side of the iPad measured using "EZ-Contrast XL88" after UVLED was switched on was greater than 10, but Y0/Y45 measured after 5 minutes from when UVLED was switched off was approximately 3 to 4 in all directions.

Based on the description above, the effects of the present invention are evident.

The present invention can be suitably applied to tablet PCs, notebook PCs, smartphones, and the like.

EXPLANATION OF REFERENCES

10: optical device
12: light source unit
12w: white light source
12u: UV light source
14: light guide plate
16: composite film
20, Xp, Yp: polarizing plate
20a, a: absorption axis
tx, ty: transmission axis

What is claimed is:
1. An optical device comprising:
a polarizing plate;
a composite film which contains a liquid crystal compound aligned in a thickness direction and a photochromic material and in which optical characteristics of the photochromic material are changed by irradiation with light and a light transmittance in the thickness direction becomes smaller than a light transmittance in a direction orthogonal to the thickness direction; and
a light-emitting unit which emits light changing the optical characteristics of the photochromic material of the composite film to the composite film,
wherein a direction of an absorption axis of the polarizing plate is parallel to a direction orthogonal to a thickness direction of the polarizing plate.
2. The optical device according to claim 1,
wherein the light-emitting unit emits ultraviolet rays.
3. A display device comprising:
a display element; and
the optical device according to claim 1.
4. A display device comprising:
a display element; and
the optical device according to claim 2.
5. The display device according to claim 3,
wherein the display element is a liquid crystal display element.
6. The display device according to claim 4,
wherein the display element is a liquid crystal display element.

7. The display device according to claim 5,
wherein the light-emitting unit of the optical device constitutes a backlight unit for allowing the liquid crystal display element to display an image.

8. The display device according to claim 6,
wherein the light-emitting unit of the optical device constitutes a backlight unit for allowing the liquid crystal display element to display an image.

9. The display device according to claim 5,
wherein the polarizing plate of the optical device constitutes a polarizing plate on a side of the backlight unit for allowing the liquid crystal display element to display an image.

10. The display device according to claim 6,
wherein the polarizing plate of the optical device constitutes a polarizing plate on a side of the backlight unit for allowing the liquid crystal display element to display an image.

11. The display device according to claim 7,
wherein the polarizing plate of the optical device constitutes a polarizing plate on a side of the backlight unit for allowing the liquid crystal display element to display an image.

12. The display device according to claim 8,
wherein the polarizing plate of the optical device constitutes a polarizing plate on a side of the backlight unit for allowing the liquid crystal display element to display an image.

* * * * *